United States Patent
Kumagai

(10) Patent No.: US 11,131,348 B2
(45) Date of Patent: Sep. 28, 2021

(54) TORQUE LIMITER

(71) Applicant: Suncall Corporation, Kyoto (JP)

(72) Inventor: Ryoukei Kumagai, Kyoto (JP)

(73) Assignee: Suncall Corporation, Kyoto (JP)

( * ) Notice: Subject to any disclaimer, the term of this patent is extended or adjusted under 35 U.S.C. 154(b) by 0 days.

(21) Appl. No.: 16/964,929

(22) PCT Filed: Jan. 9, 2019

(86) PCT No.: PCT/JP2019/000275
§ 371 (c)(1),
(2) Date: Jul. 24, 2020

(87) PCT Pub. No.: WO2019/150890
PCT Pub. Date: Aug. 8, 2019

(65) Prior Publication Data
US 2021/0040995 A1 Feb. 11, 2021

(30) Foreign Application Priority Data
Feb. 1, 2018 (JP) .............................. JP2018-016146

(51) Int. Cl.
| F16D 3/02 | (2006.01) |
| F16D 7/02 | (2006.01) |
| F16D 43/21 | (2006.01) |
| F16F 1/06 | (2006.01) |

(52) U.S. Cl.
CPC ............... *F16D 7/022* (2013.01); *F16D 3/02* (2013.01); *F16D 43/211* (2013.01); *F16F 1/06* (2013.01)

(58) Field of Classification Search
CPC ........... F16D 3/02; F16D 7/022; F16D 43/211
See application file for complete search history.

(56) References Cited

FOREIGN PATENT DOCUMENTS

| EP | 2 910 340 A1 | 8/2015 | |
| JP | 05-126160 A | 5/1993 | |
| JP | 05126160 A * | 5/1993 | ............. F16D 7/022 |
| JP | 2000-161381 A | 6/2000 | |
| JP | 2000161381 A * | 6/2000 | ............. F16D 7/022 |
| JP | 2005-63528 A | 3/2005 | |
| JP | 2005063528 A * | 3/2005 | ............. F16D 7/022 |
| JP | 2014-185677 A | 10/2014 | |

OTHER PUBLICATIONS

International Search Report issued in International Application No. PCT/JP2019/000275, dated Mar. 5, 2019, 5 pages.

* cited by examiner

*Primary Examiner* — Huan Le
(74) *Attorney, Agent, or Firm* — Sterne, Kessler, Goldstein & Fox P.L.L.C.

(57) ABSTRACT

In a torque limiter of the present invention, a difference is provided between a maximum static frictional force between the coil spring and the first outer circumferential surface and a maximum static frictional force between the coil spring and the second outer circumferential surface such that, when rotational torque in a direction of increasing the diameter of the coil spring and less than a predetermined value is applied to the first or second rotator, the first and second rotators integrally rotate via the coil spring, and one of the first and second rotators relatively rotates relative to the other of the first and second rotators together with the coil spring when the rotational torque is greater the predetermined value.

4 Claims, 11 Drawing Sheets

TORQUE LIMITER

FIELD OF THE INVENTION

The present invention relates to a torque limiter utilized as a separation roller in a sheet feeding mechanism or the like.

BACKGROUND ART

A torque limiter that includes an inner race, a coil spring wound around the inner race, and a hollow outer race accommodating the inner race around which the coil spring is wound, and that is configured such that when external force (rotational torque) applied to the outer race is less than or equal to a predetermined threshold value, relative rotation of the outer race around the axis relative to the inner race is prohibited, and when the external force exceeds the threshold value, relative rotation of the outer race around the axis relative to the inner race is permitted, is widely used as, for example, a separation roller in a sheet feeding mechanism for feeding sheets of paper or the like one by one (see, for example, Patent Literature 1 below).

The coil spring has a main body wound around the inner race and an engagement part extending radially outward from one end of the main body and engaged with the outer race, and when the outer race is rotated toward one side around the axis, the engagement part is pushed such that the tightening force of the coil spring is reduced.

Specifically, when external force toward one side around the axis acting on the outer race is less than or equal to the tightening force of the coil spring, rotation of the outer race toward one side around the axis is prohibited by the coil spring. On the other hand, when the external force exceeds the tightening force of the coil spring, the coil spring is loosened by the outer race, thereby permitting the outer race to relatively rotate around the axis relative to the inner race together with the coil spring.

The operation of the torque limiter will now be described in more detail in reference to an example wherein the torque limiter is used as a separation roller in a sheet feeding mechanism.

The sheet feeding mechanism includes a feed roller rotationally driven around the axis by power provided from a power source so as to fee a sheet, and a torque limiter disposed so as to face the feed roller and hold the sheet between the feed roller and the torque limiter to act as a separation roller.

The feed roller and the torque limiter are configured such that the feed roller-side frictional force between the feed roller and the sheet and the torque limiter-side frictional force between the torque limiter and the sheet are greater than the inter-sheet frictional force between stacked sheets.

More specifically, when one sheet is held and conveyed between the feed roller and the torque limiter, the sheet is conveyed due to the feed roller-side frictional force in accordance with the rotation of the feed roller, and the torque limiter is rotated by being driven due to the torque limiter-side frictional force in accordance with the conveyance of the sheet.

That is to say, external force directed toward one side around the axis acts on the outer race of the torque limiter via the sheet conveyed by the feed roller. By configuring this external force to exceed the threshold value, the outer race is rotated around the axis relative to the inner race together with the coil spring when one sheet is fed.

On the other hand, when a plurality of stacked sheets are held between the feed roller and the torque limiter, since the feed roller-side frictional force and the torque limiter-side frictional force are configured to be greater than the inter-sheet frictional force as described above, only one sheet that is in contact with the feed roller among the plurality of sheets is conveyed by the feed roller while sliding on another stacked sheet.

At this time, force corresponding to the inter-sheet frictional force acts, from the feed roller-side sheet that is conveyed by the feed roller, on the outer race of the torque limiter via the torque limiter-side sheet that is in contact with the torque limiter.

However, the force acting on the outer race in this state is less than or equal to the threshold value and, accordingly, the rotation of the outer race is prevented by the coil spring.

Thus, in the above torque limiter, a state where the coil spring, while being in slide-contact with the inner race, relatively rotates around the axis relative to the inner race (a state where, in the sheet feeding mechanism, only one sheet is held between the feed roller and the torque limiter, then the sheet is conveyed by the feed roller, and the outer race and the coil spring relatively rotate around the axis relative to the inner race in accordance with the conveyance of the sheet) and a state where the coil spring is incapable of relative rotation relative to the inner race (a state where, in the sheet feeding mechanism, a plurality of stacked sheets are held between the feed roller and the torque limiter, then only the sheet that is in contact with the feed roller is conveyed by the feed roller while sliding on another stacked sheet, and the outer race and the coil spring do not relatively rotate relative to the inner race) are repetitively attained.

Meanwhile, in the above conventional torque limiter, force that acts on the outer race is locally applied to the engagement part of the coil spring, and thus there is the problem in that it is difficult to increase durability.

PRIOR ART DOCUMENT

Patent Literature

Patent Literature 1: JP 2014-185677A

SUMMARY OF THE INVENTION

The present invention has been conceived in view of such conventional art, and an object of the present invention is to provide a torque limiter wherein first and second rotators coaxially disposed are connected via a coil spring, the first and second rotators integrally rotate via the coil spring when rotational torque acting on the first or second rotator is less than a predetermined value, and one of the first and second rotators relatively rotates relative to the other of the first and second rotators together with the coil spring when the rotational torque exceeds the predetermined value, wherein the torque limiter has an increased durability.

In order to achieve the object, the present invention provides a torque limiter including: a first rotator having a first end surface facing in a first axial direction and a first outer circumferential surface extending from a radially outer edge of the first end surface toward a second axial direction opposite to the first axial direction; a second rotator having a second end surface facing in the second axial direction and a second outer circumferential surface extending from a radially outer edge of the second end surface in the first axial direction, and disposed coaxially with the first rotator, with a second contact region on the second end surface being in contact with a first contact region on the first end surface; and a coil spring externally fitted so as to bridge the first and second outer circumferential surfaces, wherein a difference is provided between a maximum static frictional force between the coil spring and the first outer circumferential surface and a maximum static frictional force between the coil spring and the second outer circumferential surface such that, when rotational torque that is in a direction of increasing the diameter of the coil spring and that is less than a predetermined value is applied to the first or second rotator, the first and second rotators integrally rotate via the coil spring, and one of the first and second rotators relatively rotates relative to the other of the first and second rotators together with the coil spring when the rotational torque is greater the predetermined value.

Since the torque limiter according to the present invention includes the first rotator having the first end surface and the first outer circumferential surface, the second rotator having the second end surface and the second outer circumferential surface and the coil spring, wherein the first and second rotators are disposed coaxially with each other with the first contact region on the first end surface is in contact with the second contact region on the second end surface, the coil spring is inserted around the first and second rotators so as to bridge the first and second outer circumferential surfaces, and the difference is provided between the maximum static frictional force between the coil spring and the first outer circumferential surface and the maximum static frictional force between the coil spring and the second outer circumferential surface such that, when rotational torque that is in the direction of increasing the diameter of the coil spring and that is less than a predetermined value is applied to the first or second rotator, the first and second rotators integrally rotate via the coil spring, and one of the first and second rotators relatively rotates relative to the other of the first and second rotators together with the coil spring when the rotational torque is greater the predetermined value, it is possible to prevent the rotational torque from being locally applied to the coil spring to increase durability.

In a preferable configuration, the coil spring is configured to have a cross-sectional shape composed of an inner side in contact with the first and second outer circumferential surfaces, a pair of lateral sides extending radially outward from respective edges of the inner side, and an outer side connecting radially outer edges of the pair of lateral sides, and the inner side and the outer side are made longer than the pair of lateral sides.

The preferable configuration makes it possible to effectively prevent or reduce the possibility of the occurrence of the coil spring entering a gap that may appear between the first and second end surfaces and simplify a supporting structure for supporting the first and second rotators.

In a first embodiment, a radially outer portion out of the first end surface forms the first contact region, a radially outer portion out of the second end surface forms the second contact region, the first rotator includes a main body having the first end surface and the first outer circumferential surface, an insertion shaft extending from the main body in the first axial direction at a place more radially toward the center than the first contact region is, and an outward extending shaft extending from the main body in the second axial direction, and the second rotator includes a cylindrical main body having the second end surface and the second outer circumferential surface and provided with a bearing hole at a place more radially toward the center than the second contact region is to receive the insertion shaft such that the insertion shaft is rotatable around the axis, and an outer race formed integrally with the main body so as to define a space for accommodating the coil spring between the second outer circumferential surface and the outer race.

The torque limiter according to the first embodiment may include a support member for supporting the first and second rotators such that the first and second rotators are rotatable around the axis.

The support member may have a first support wall for supporting a portion, which extends from the bearing hole in the first axial direction, of the insertion shaft while preventing movement of the second rotator in the first axial direction by being in contact with the first axial side of the second rotator, and a second support wall for supporting the outward extending shaft while preventing movement of the first rotator in the second axial direction by being in contact with the second axial side of the first rotator.

In a second embodiment, a radially outer portion out of the first end surface forms the first contact region, a radially outer portion out of the second end surface forms the second contact region, the first rotator includes a main body having the first end surface and the first outer circumferential surface and provided with a bearing hole extending in the second axial direction at a place more radially toward the center than the first contact region is, and an outward extending shaft extending from the main body in the second axial direction, and the second rotator includes a main body having the second end surface and the second outer circumferential surface, an outward extending shaft extending from the main body in the first axial direction, and an insertion shaft extending from the main body in the second axial direction at a place more radially toward the center than the second contact region is and inserted into the bearing hole.

The torque limiter according to the second embodiment may include a support member for supporting the first and second rotators such that the first and second rotators are rotatable around the axis.

The support member has a first support wall for supporting the outward extending shaft of the second rotator while preventing movement of the second rotator in the first axial direction by being in contact with the first axial side of the second rotator, and a second support wall for supporting the outward extending shaft of the first rotator while preventing movement of the first rotator in the second axial direction by being in contact with the second axial side of the first rotator.

In any one of the above various configurations, the coil spring may have a uniform inner diameter over the entirely in an axial direction, and the first outer circumferential surface may have a greater diameter than the second outer circumferential surface.

Alternatively, the second outer circumferential surface may have a greater diameter than the first outer circumferential surface.

EMBODIMENT FOR CARRYING OUT THE INVENTION

Below, a preferable embodiment of the torque limiter according to the present invention will now be described with reference to the appended drawings.

Figure 1:
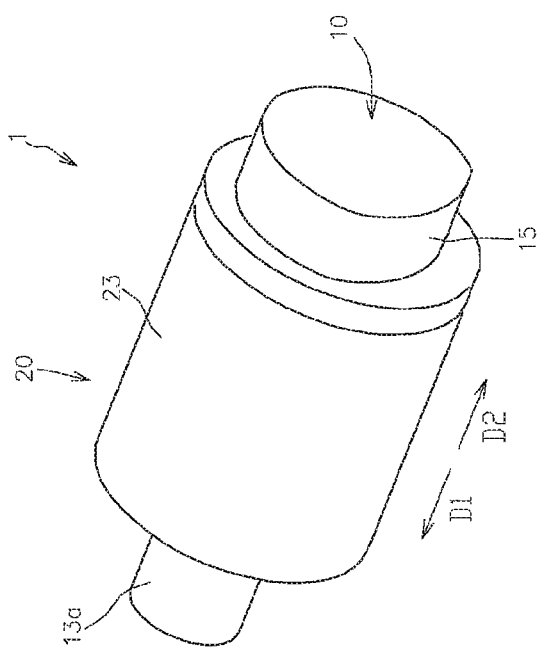
FIG. 1 is a perspective view of a torque limiter according to one embodiment of the present invention.
Figure 2:
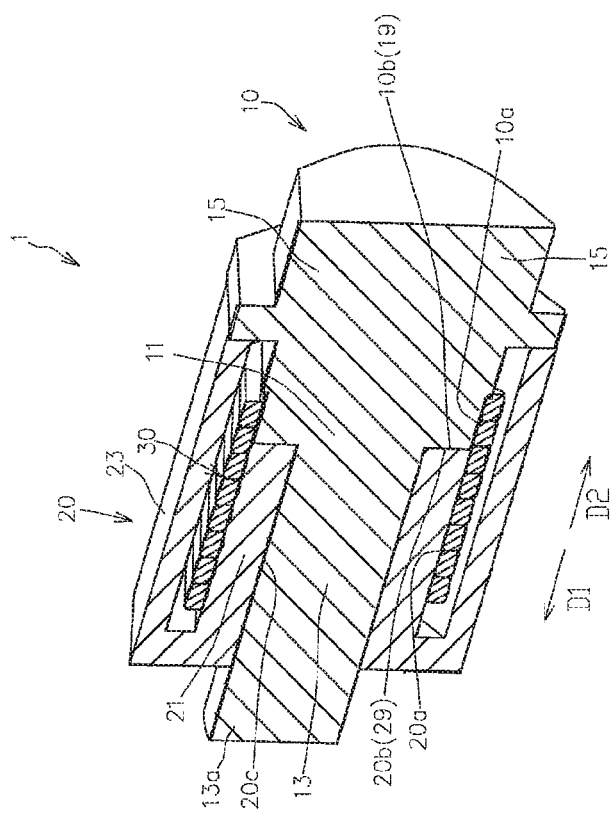
FIG. 2 is a perspective cross-sectional view of the torque limiter.
Figure 3:
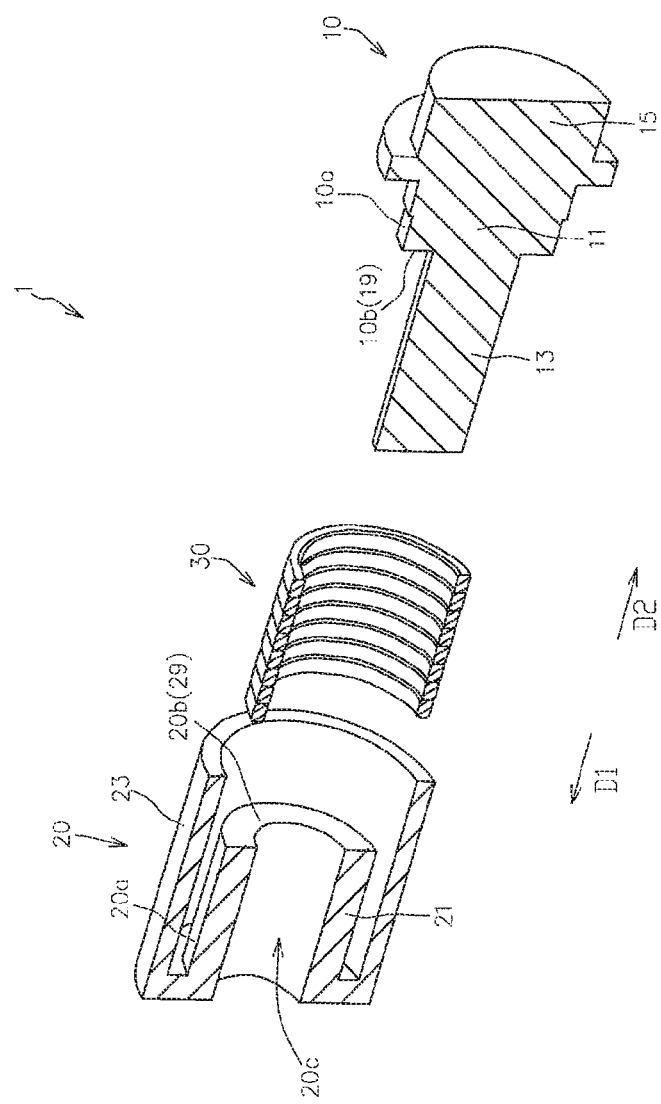
FIG. 3 is an exploded perspective cross-sectional view of the torque limiter.

FIGS. 1 to 3 respectively show a perspective view, a perspective cross-sectional view, and an exploded perspective cross-sectional view of a torque limiter 1 according to the present embodiment.

As shown in FIGS. 1 to 3, the torque limiter 1 includes a first rotator 10 and a second rotator 20 coaxially disposed so as to be relatively rotatable, and a coil spring 30 externally fitted so as to bridge a first outer circumferential surface 10a of the first rotator 10 and a second outer circumferential surface 20a of the second rotator 20.

The first rotator 10 has a first end surface 10b facing in a first axial direction D1 and the first outer circumferential surface 10a which extends from the radially outer edge of the first end surface 10b in a second axial direction D2 opposite to the first axial direction D1 and to which the coil spring 30 is externally fitted.

In the present embodiment, the first rotator 10 has a main body 11 having the first end surface 10b and the first outer circumferential surface 10a, an insertion shaft 13 extending from the main body 11 in the first axial direction D1, and an outward extending shaft 15 extending from the main body 11 in the second axial direction D2.

The second rotator 20 has a second end surface 20b facing in the second axial direction D2 and the second outer circumferential surface 20a extending from the radially outer edge of the second end surface 20b in the first axial direction D1.

The first and second rotators 10, 20 are coaxially disposed so as to be relatively rotatable around the axis, with a first contact region 19 on the first end surface 10b and a second contact region 29 on the second end surface 20b being in contact with each other.

In the present embodiment, a radially outer portion of the first end surface 10b forms the first contact region 19, and a radially outer portion of the second end surface 20b forms the second contact region 29.

That is to say, the insertion shaft 13 extends from the main body 11 in the first axial direction D1 at a place more radially toward the center than the first contact region 19 is.

The second rotator 20 has a cylindrical main body 21 having the second end surface 20b and the second outer circumferential surface 20a and provided with a bearing hole 20c at a place more radially toward the center than the second contact region 29 is to receive the insertion shaft 13 such that the insertion shaft 13 is rotatable around the axis, and an outer race 23 formed integrally with the main body 21 so as to define a space for accommodating the coil spring 30 between the second outer circumferential surface 20a and the outer race 23.

The coil spring 30 is configured to exert the following tightening force on the first and second outer circumferential surfaces 10a, 20a.

That is to say, a difference is provided between a maximum static frictional force F1 between the coil spring 30 and the first outer circumferential surface 10a and a maximum static frictional force F2 between the coil spring 30 and the second outer circumferential surface 20a such that, at the time of rotating one of the first and second rotators 10, 20 (hereinafter referred to as a drive-side rotator) around the axis in the direction of increasing the diameter of the coil spring 30 (the releasing direction for reducing the tightening force), the first and second rotators 10, 20 integrally rotate via the coil spring 30 when the rotational torque applied to the drive-side rotator is less than a predetermined value, and one of the first and second rotators 10, 20 rotates relative to the other of the first and second rotators 10, 20 together with the coil spring 30 when the rotational torque exceeds the predetermined value.

This point will now be described in detail in reference to an example wherein the second rotator 20 serves as the drive-side rotator.

For example, in the case where the maximum static frictional force F1 is greater than the maximum static frictional force F2 by configuring an outer diameter d1 of the first outer circumferential surface 10a to be greater than an outer diameter d2 of the second outer circumferential surface 20a, the coil spring 30 and the first rotator 10 do not rotate, and only the second rotator 20 rotates around the axis while being in slide-contact with the coil spring 30, when the rotational torque applied to the second rotator 20 acting as the drive-side rotator exceeds the predetermined value.

On the other hand, for example, in the case where the maximum static frictional force F2 is greater than the maximum static frictional force F1 by configuring the outer diameter d2 of the second outer circumferential surface 20a to be greater than the outer diameter d1 of the first outer circumferential surface 10a, the second rotator 20 and the coil spring 30 integrally rotate around the axis relative to the first rotator 10 when the rotational torque applied to the second rotator 20 acting as the drive-side rotator exceeds the predetermined value. That is to say, the first rotator 10 does not rotate, and the second rotator 20 and the coil spring 30 integrally rotate around the axis, with the coil spring 30 being in slide-contact with the first outer circumferential surface 10a of the first rotator 10.

As in this example, in the case where the outer diameters d1, d2 of the first and second outer circumferential surfaces 10a, 20a are different, a difference can be provided between the maximum static frictional force F1 and the maximum static frictional force F2 even when the entirety of the coil spring 30 has a uniform inner diameter in the axial direction.

The torque limiter 1 according to the present embodiment further includes a support member 40 for supporting the first and second rotators 10, 20 such that the first and second rotators 10, 20 are rotatable around the axis.

Figure 4:
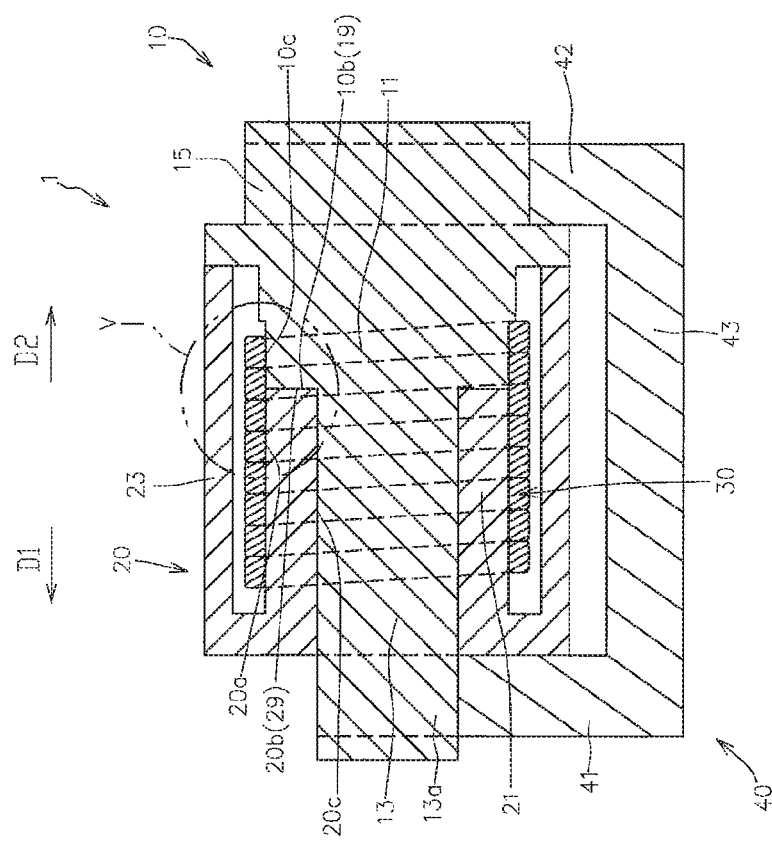
FIG. 4 is a vertical cross-sectional side view of the torque limiter, with a support member being attached.

FIG. 4 shows a vertical cross-sectional side view of the torque limiter 1, with the support member 40 being attached.

As shown in FIG. 4, the support member 40 has a first support wall 41 for supporting a portion 13a, which extends from the bearing hole 20c in the first axial direction D1, of the insertion shaft 13 while preventing movement of the second rotator 20 in the first axial direction D1 by being in contact with the first axial side of the second rotator 20, and a second support wall 42 for supporting the outward extending shaft 15 while preventing movement of the first rotator 10 in the second axial direction D2 by being in contact with the second axial side of the first rotator 10.

In the depicted embodiment, the support member 40 further has a bottom wall 43 for connecting the lower ends of the first and second support walls 41, 42 to each other as a connecting member for connecting the first and second support walls 41, 42.

Figure 5:
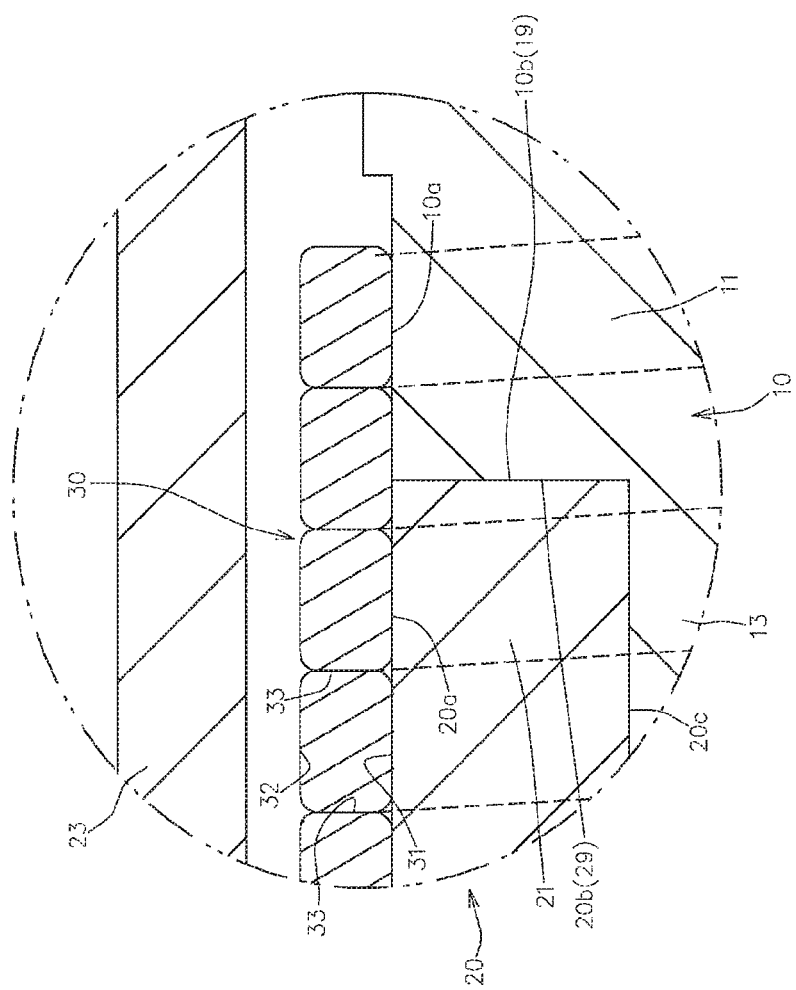
FIG. 5 is an enlarged view of the V part in FIG. 4.

FIG. 5 shows an enlarged view of the V part in FIG. 4.

As shown in FIG. 5, in the present embodiment, the coil spring 30 has such a rectangular cross-sectional shape that an inner side 31 in contact with the first and second outer circumferential surfaces 10a, 20a is longer than lateral sides 33 extending in the radial direction.

Specifically, the cross-sectional shape of the coil spring 30 has the inner side 31 in contact with the first and second outer circumferential surfaces 10a, 20a, a pair of lateral sides 33 extending radially outward from the respective edges of the inner side 31, and an outer side 32 connecting the radially outer edges of the pair of lateral sides 33, and the inner side 31 and the outer side 32 are longer than the pair of lateral sides 33.

This configuration makes it possible to effectively prevent or reduce the possibility of the occurrence of the coil spring 30 entering a gap that may appear between the first and second end surfaces 10b, 20b and causing the torque limiter 1 to not operate properly.

That is to say, the support member 40 prevents the first and second rotators 10, 20 from moving away from each other, but in order to support the first and second rotators 10, 20 so as not to allow a gap between the first and second end surfaces 10b, 20b at all, the support member 40 needs to be precisely manufactured, which results in increased costs.

A gap that may appear between the first and second end surfaces 10b, 20b can also be prevented by, for example, supporting the first and second rotators 10, 20 so as to be biased such that the first and second end surfaces 10b, 20b are pressed against each other, but this configuration requires a mechanism for biasing the first and second rotators 10, 20, which results in increased costs, also produces a large frictional force between the first and second end surfaces 10b, 20b, and inhibits relative rotational movement of the first and second rotators 10, 20.

Concerning this point, in the present embodiment, the coil spring 30 having a cross-sectional shape in which the inner side 31 and the outer side 32 are longer than the lateral sides 33 is used, and, accordingly, the occurrence of the coil spring 30 entering a space between the first and second end surfaces 10b, 20b and inhibiting proper operation of the torque limiter 1 is effectively prevented or reduced while simplifying the structure of the support member 40 for supporting the first and second rotators 10, 20.

The torque limiter 1 is suitably used as a separation roller in a sheet feeding mechanism for feeding a plurality of stacked sheets one by one.

Figure 6:
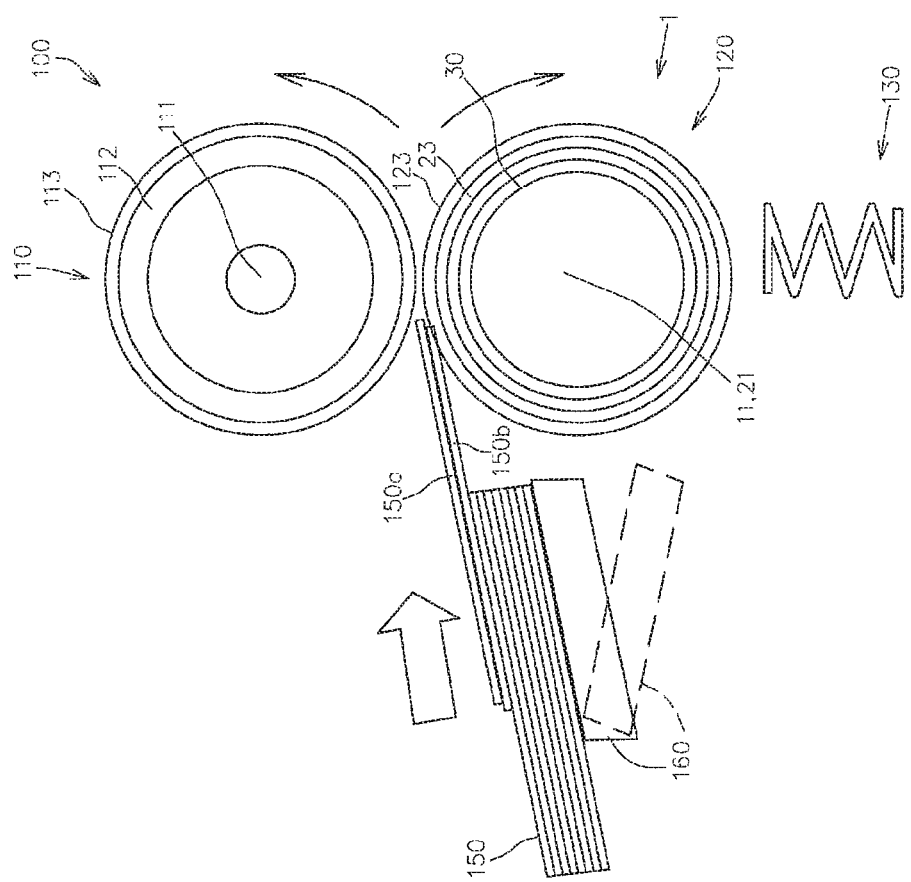
FIG. 6 is a schematic view of a sheet feeding mechanism to which the torque limiter is applied as a separation roller.

FIG. 6 shows a schematic view of a sheet feeding mechanism 100 to which the torque limiter 1 according to the present embodiment is applied as a separation roller 120.

As shown in FIG. 6, the sheet feeding mechanism 100 includes a feed roller 110 for feeding a sheet 150 by being driven by a power source and the torque limiter 1 disposed so as to face the feed roller 110 such that the sheet 150 is held between the feed roller 110 and the torque limiter 1.

In this case, the second rotator 20 including the outer race 23 acts as the separation roller 120.

In the depicted embodiment, the sheet feeding mechanism 100 further includes a biasing member 130 for pressing the torque limiter 1 toward the feed roller 110 and a tray 160 for accommodating a plurality of stacked sheets 150.

The tray 160 can take an operating position (the solid line in FIG. 6) where the feed roller 110 can act on the uppermost sheet 150 of the plurality of sheets 150 and a retreated position (the broken line in FIG. 6) where the plurality of sheets 150 are retreated from the feed roller 110.

The second rotator 20, when one sheet 150 is held between the feed roller 110 and the outer race 23, supports conveyance of the single sheet 150 and, when a plurality of stacked sheets 150a, 150b are held between the feed roller 110 and the outer race 23, acts as the separation roller 120 for enabling conveyance of only one sheet 150a that is in contact with the feed roller 110.

Specifically, the feed roller 110 and the torque limiter 1 are configured such that the feed roller-side frictional force between the feed roller 110 and the sheet 150 and the torque limiter-side frictional force between the second outer race 23 and the sheet 150 are greater than the inter-sheet frictional force between the plurality of stacked sheets 150.

Specifically, as shown in FIG. 6, the feed roller 110 has a drive shaft 111 rotationally driven around the axis by the power source, a roller body 112 fitted around the drive shaft 111 so as to be incapable of relative rotation, and a feed roller rubber 113 attached to the outer circumference of the roller body 112.

On the other hand, the torque limiter 1 has a separation roller rubber 123 fitted around the outer race 23 of the second rotator 20 in addition to having the first rotator 10, the second rotator 20, and the coil spring 30.

The feed roller rubber 113 and the separation roller rubber 123 are configured such that the feed roller-side frictional force and the torque limiter-side frictional force are greater than the inter-sheet frictional force.

The sheet feeding mechanism 100 operates as follows.

When only one sheet 150 is held between the feed roller 110 and the outer race 23, the sheet 150 is conveyed under the feed roller-side frictional force in accordance with the rotation of the feed roller 110.

At this time, the outer race 23 of the torque limiter 1 is rotated in the releasing direction around the axis under the torque limiter-side frictional force in accordance with the conveyance of the sheet 150.

That is to say, rotational torque in the releasing direction around the axis acts on the outer race 23 via the sheet 150.

By configuring this rotational torque to be greater than the smaller of the maximum static frictional forces F1 and F2 (e.g., F2), the first rotator 10 and the coil spring 30 do not rotate, and only the second rotator 20 rotates around the axis, with the second outer circumferential surface 20a being in slide-contact with the coil spring 30.

Accordingly, the sheet 150 is conveyed while being held by the feed roller 110 and the torque limiter 1 acting as the separation roller 120.

On the other hand, when a plurality of stacked sheets 150a, 150b are held between the feed roller 110 and the outer race 23, only one feed roller-side sheet 150a that is in contact with the feed roller 110 is conveyed in accordance with the rotation of the feed roller 110.

That is to say, as described above, the feed roller-side frictional force and the torque limiter-side frictional force are both greater than the inter-sheet frictional force and, thus, when a plurality of stacked sheets 150a, 150b are held between the feed roller 110 and the outer race 23, slippage occurs between the feed roller-side sheet 150a and another stacked sheet 150b that is in contact with the feed roller-side sheet.

More specifically, in accordance with the rotation of the feed roller 110, the feed roller-side sheet 150a is conveyed under the feed roller-side frictional force. At this time, rotational torque transmitted via inter-sheet frictional force is applied to the outer race 23.

By configuring this rotational torque transmitted via the inter-sheet frictional torque to be less than the smaller of the maximum static frictional forces F1 and F2 (e.g., F2), the second rotator 20 does not rotate, and only the feed roller-side sheet 150a is conveyed while sliding on another stacked sheet 150b.

Figure 7:
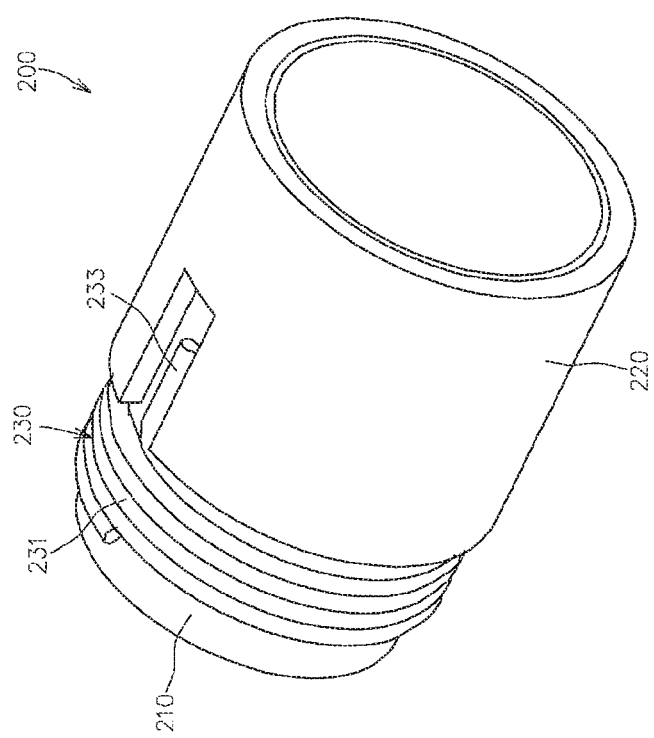
FIG. 7 is a perspective view of a conventional torque limiter.

The torque limiter 1 with such a configuration has greater durability than a conventional torque limiter 200 shown in FIG. 7.

That is to say, as shown in FIG. 7, the conventional torque limiter 200 has an inner race 210, a coil spring 230 wound around the inner race, and an outer race 220 inserted around the inner race 210 so as to be relatively rotatable.

The coil spring 230 has a main body 231 wound around the inner race 210 and an engagement part 233 extending from one end side of the main body 231, and the engagement part 233 is engaged with the outer race 220.

In the conventional torque limiter 200, when rotational torque that is in the direction of increasing the diameter of the coil spring 230 and that exceeds a predetermined value acts on the outer race 220, the outer race 220 relatively rotates relative to the inner race 210 together with the coil spring 230.

At this time, the rotational torque acts locally on the engagement part 233 of the coil spring 230 and, thus, there is the problem in that it is difficult to increase the durability of the coil spring 230.

On the other hand, in the torque limiter 1 according to the present embodiment, rotational torque that acts on one of the first and second rotators 10, 20 (a drive-side rotator) acts on the entirety of a portion, which is wound around the drive-side rotator, of the coil spring 30.

Accordingly, the torque limiter 1 according to the present embodiment has greater durability than the conventional torque limiter 200 in which the rotational torque acts locally on the engagement part 233 of the coil spring 230.

Moreover, as described above, in the torque limiter 1 according to the present embodiment, a spring having such a cross-sectional shape that the inner side 31 and the outer side 32 are longer than the lateral sides 33 is used as the coil spring 30 and, thus, the support structure for supporting the first and second rotators 10, 20 is simplified.

Below, a durability test performed on examples (working examples) of the torque limiter 1 will now be described.

As working examples, three torque limiters having the form depicted in FIGS. 1 to 4 and having the same dimensional and component configurations as described below were prepared (Examples 1 to 3).

First rotator 10: Polyoxymethylene (POM) resin
Outer diameter of first outer circumferential surface 10a: 6.3 mm
Second rotator 20: Polyphenylene ether (PPE) resin
Outer diameter of second outer circumferential surface 20a: 6.0 mm
Coil spring 30: Spiral member formed of a piano wire having a rectangular cross-sectional shape of 0.762 mm×0.508 mm such that the rotational torque required to rotate the second rotator 20 in the releasing direction around the axis, with the first rotator 10 being secured, is 2.2 cN·m As comparative examples, three torque limiters having the form depicted in FIG. 7 and having the same dimensional and component configurations as described below were prepared (Comparative Examples 1 to 3).

Inner race 210: Polyphenylene-ether (PPE) resin
Outer diameter of inner race 210: 6.0 mm
Outer race 220: Polyoxymethylene (POM) resin
Coil spring 230: Spiral member formed of a piano wire having a rectangular cross-sectional shape of 0.762 mm×0.508 mm such that the rotational torque required to rotate the outer race 220 in the releasing direction around the axis, with the inner race 210 being secured, is 2.2 cN·m One ON/OFF operation cycle consisting of rotating the second rotator 20 in the releasing direction around the axis at a rotational speed of 250 rpm for 1 second, with the first rotator 10 being secured, and then suspending the second rotator 20 for 9 seconds was repeatedly performed on Examples 1 to 3 to measure rotational torque required when rotating only the second rotator 20 around the axis without rotating the first rotator 10 and the coil spring 30.

Figure 8A:
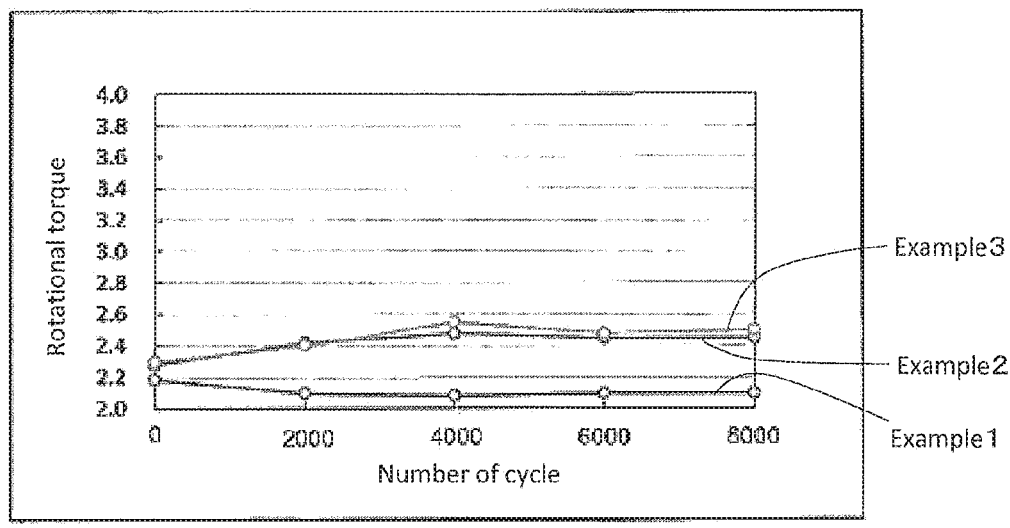
FIG. 8A is a graph showing a measurement result of a durability test performed on examples of the present invention.

The measurement results are shown in FIG. 8A.

One ON/OFF operation cycle consisting of rotating the outer race 220 in the releasing direction around the axis at a rotational speed of 250 rpm for 1 second, with the inner race 210 being secured, and then suspending the outer race 220 for 9 seconds was repeatedly performed on Comparative Examples 1 to 3 to measure rotational torque required when rotating only the outer race 220 and the coil spring 230 around the axis without rotating the inner race 210.

Figure 8B:
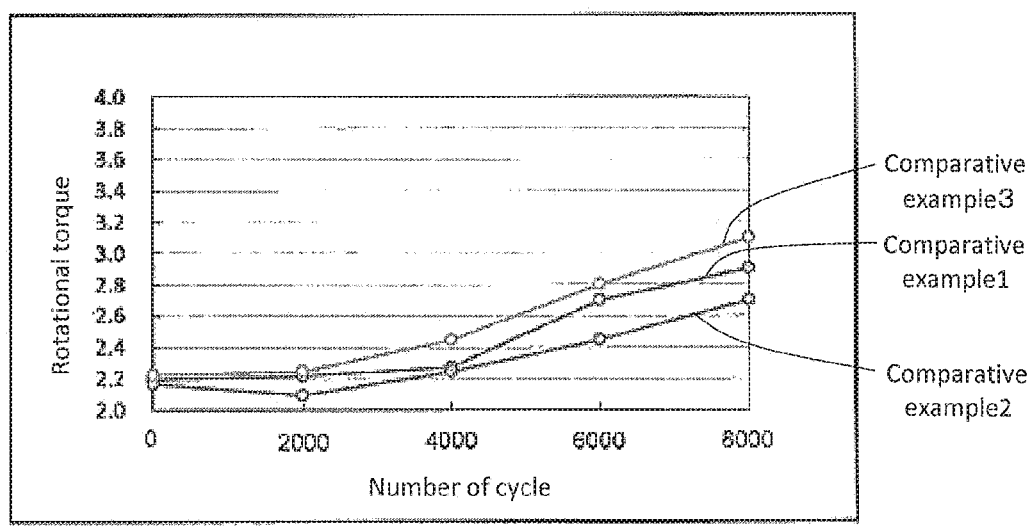
FIG. 8B is a graph showing a measurement result of a durability test performed on comparative examples of the conventional configuration.

The measurement results are shown in FIG. 8B.

As shown in FIG. 8B, in Comparative Examples 1 to 3, the rotational torque required to rotate the outer race 220 started to increase when the operation exceeded 4000 cycles and, thereafter, the rotational torque increased as the number of cycles increased up to 8000 cycles.

On the other hand, in Examples 1 to 3, substantially no change was observed in rotational torque required to rotate the second rotator 20 up to 8000 cycles.

From these results as well, it can be confirmed that the torque limiter 1 according to the present embodiment has greater durability than the conventional torque limiter 200.

In the present embodiment, the second rotator 20 includes the main body 21 having the bearing hole 20c, and the support member 40 is configured to support the portion 13a, which extends from the bearing hole 20c in the first axial direction, of the insertion shaft 13 of the first rotator 10 and the outward extending shaft of the first rotator 10. However, the present invention is not limited to such a configuration.

Figure 9:
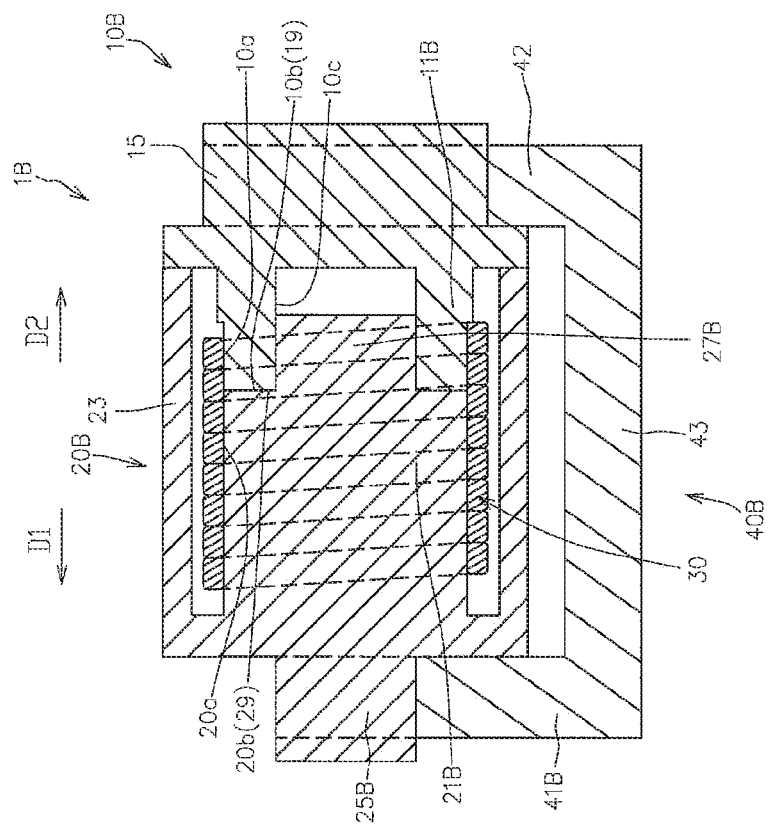
FIG. 9 is a vertical cross-sectional side view of a torque limiter according to a first modification of the embodiment.

FIG. 9 shows a vertical cross-sectional side view of a torque limiter 1B according to a first modification of the above embodiment.

In the drawing, the same components as those in the above embodiment are given the same reference numbers.

As shown in FIG. 9, the torque limiter 1B according to the first modification includes a first rotator 10B, a second rotator 20B, the coil spring 30, and a support member 40B for coaxially supporting the first and second rotators 10B, 20B such that the first and second rotators 10B, 20B are relatively rotatable.

The first rotator 10B has a main body 11B having the first end surface 10b and the first outer circumferential surface 10a and provided with a bearing hole 10c extending in the second axial direction D2 at a place more radially toward the center than the first contact region 19 is, and the outward extending shaft 15 extending from the main body 11B in the second axial direction D2.

The second rotator 20B has a main body 21B having the second end surface 20b and the second outer circumferential surface 20a, an outward extending shaft 25B extending from the main body 21B in the first axial direction D1, and an insertion shaft 27B extending from the main body 21B in the second axial direction D2 at a place more radially toward the center than the second contact region 29 is and inserted into the bearing hole 10c.

The support member 40B has a first support wall 41B for supporting the outward extending shaft 25B of the second rotator 20B while preventing movement of the second rotator 20B in the first axial direction D1 by being in contact with the first axial side of the second rotator 20B, a second support wall 42 for supporting the outward extending shaft 15 of the first rotator 10B while preventing movement of the first rotator 10B in the second axial direction D2 by being in contact with the second axial side of the first rotator 10B, and the bottom wall 43 for connecting the first support wall 41B and the second support wall 42.

Figure 10:
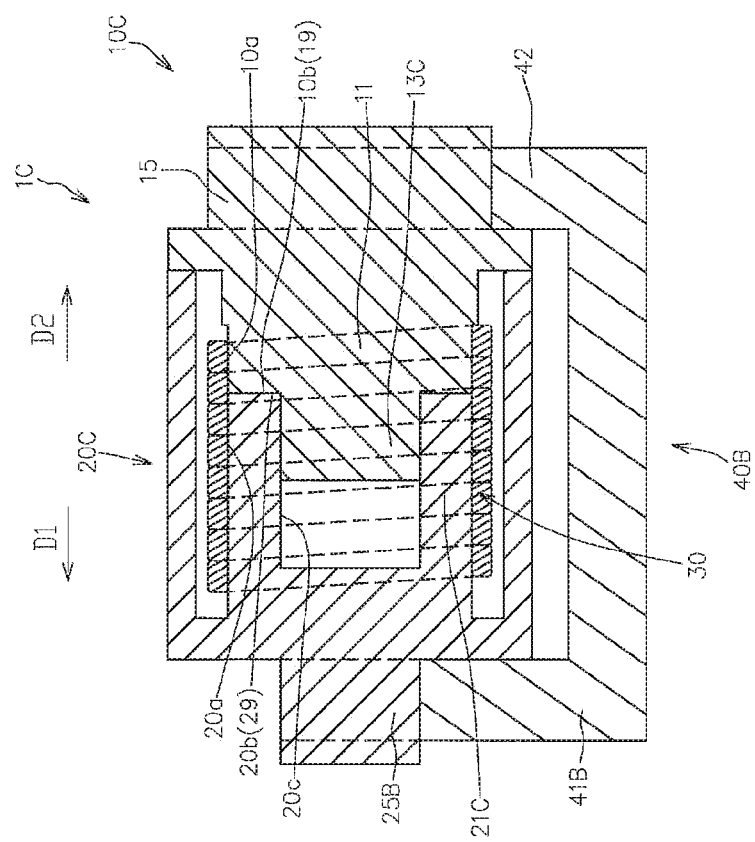
FIG. 10 is a vertical cross-sectional side view of a torque limiter according to a second modification of the embodiment.

FIG. 10 shows a vertical cross-sectional side view of a torque limiter 1C according to a second modification of the above embodiment.

In the drawing, the same components as those in the above embodiment 1 and the first modification 1B and are given the same reference numbers.

As shown in FIG. 10, the torque limiter 1C according to the second modification includes a first rotator 10C, a second rotator 20C, the coil spring 30, and the support member 40B.

The first rotator 10C has a main body 11 having the first end surface 10b and the first outer circumferential surface 10a, an insertion shaft 13C extending from the main body 11 in the first axial direction at a place more radially toward the center than the first contact region 19b is, and an outward extending shaft 15 extending from the main body 11 in the second axial direction.

The second rotator 20C has a main body 21C having the second end surface 20b and the second outer circumferential surface 20a and provided with a bearing hole 20c extending in the first axial direction at a place more radially toward the center than the second contact region 29 is, and the outward extending shaft 25B extending from the main body 21C in the first axial direction.

Figure 11:
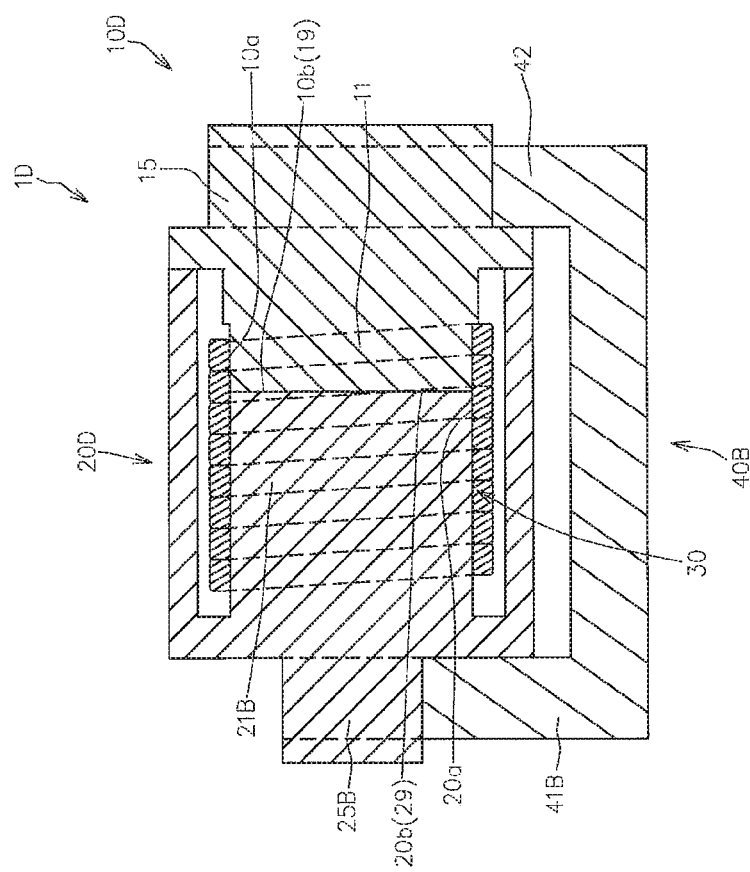
FIG. 11 is a vertical cross-sectional side view of a torque limiter according to a third modification of the embodiment.

FIG. 11 shows a vertical cross-sectional side view of a torque limiter 1D according to a third modification of the above embodiment.

In the drawing, the same components as those in the above embodiment 1, the first modification 1B, and the second modification 1C are given the same reference numbers.

As shown in FIG. 11, the torque limiter 1D according to the third modification includes a first rotator 10D, a second rotator 20D, the coil spring 30, and the support member 40B.

The first rotator 10D has the main body 11 having the first end surface 10b and the first outer circumferential surface 10a, and the outward extending shaft 15 extending from the main body 11 in the second axial direction.

The second rotator 20D has the main body 21B having the second end surface 20b and the second outer circumferential surface 20a, and the outward extending shaft 25B extending from the main body 21B in the first axial direction.

In the third modification, the entirety of the first end surface 10b forms the first contact region 19, and the entirety of the second end surface 20b forms the second contact region 29.

DESCRIPTION OF THE REFERENCE NUMERALS 1, 1B-1D Torque limiter
10 First rotator
10a First outer circumferential surface
10b First end surface
11, 11B Main body
13 Insertion shaft
15 Outward extending shaft
19 First contact region
20 Second rotator
20a Second outer circumferential surface
20b Second end surface
20c Bearing hole
21, 21B Main body
23 Outer race
25B Outward extending shaft
27B Insertion shaft
29 Second contact region
30 Coil spring
31 Inner side
32 Outer side
33 Lateral side
40, 40B Support member
41 First support wall
42 Second support wall

The invention claimed is:

1. A torque limiter comprising:
a first rotator that includes a main body having a first end surface facing in a first axial direction and a first outer circumferential surface extending from a radially outer edge of the first end surface toward a second axial direction opposite to the first axial direction, an insertion shaft extending from the main body in the first axial direction at a place more radially toward a center than a first contact region of the first end surface is and an outward extending shaft extending from the main body in the second axial direction;
a second rotator that includes a main body having a second end surface facing in the second axial direction and a second outer circumferential surface extending from a radially outer edge of the second end surface in the first axial direction and an outer race formed integrally with the main body so as to define a space for accommodating a coil spring between the second outer circumferential surface and the outer race, the main body of the second rotator having a cylindrical shape provided with a bearing hole at a place more radially toward a center than a second contact region of the second end surface is to receive the insertion shaft in a rotatable manner around an axis, the second rotator being disposed coaxially with the first rotator, with the second contact region on the second end surface being in contact with the first contact region on the first end surface, and the coil spring externally fitted so as to bridge the first and second outer circumferential surfaces; and
a support member supporting the first rotator in a rotatable manner around the axis,
wherein a difference is provided between a maximum static frictional force between the coil spring and the first outer circumferential surface and a maximum static frictional force between the coil spring and the second outer circumferential surface such that, when rotational torque that is in a direction of increasing the diameter of the coil spring and that is less than a predetermined value is applied to the first or second rotator, the first and second rotators rotate together by a static frictional force between the first and second rotators and the coil spring, and one of the first and second rotators rotates relative to the other of the first and second rotators together with the coil spring when the rotational torque is greater the predetermined value, wherein the insertion shaft has a portion that extends outward in the first axial direction past the main body of the second rotator, wherein an end surface of the outer race that faces in the second axial direction is in contact with an end surface of the main body of the first rotator that faces in the first axial direction so that the outward extending shaft is placed more toward the second axial direction than the second rotator is, and wherein the support member has a first support wall for supporting the portion of the insertion shaft that extends outward from the bearing hole in the first axial direction while preventing movement of the second rotator in the first axial direction by being in contact with a first axial side of the second rotator, and a second support wall for supporting the outward extending shaft while preventing movement of the first rotator in the second axial direction by being in contact with a second axial side of the first rotator.

2. The torque limiter according to claim 1, wherein the coil spring has a cross-sectional shape composed of an inner side in contact with the first and second outer circumferential surfaces, a pair of lateral sides extending radially outward from respective edges of the inner side, and an outer side connecting radially outer edges of the pair of lateral sides, and wherein the inner side and the outer side are longer than the pair of lateral sides.

3. The torque limiter according to claim 1, wherein the entirety of the coil spring has a uniform inner diameter in an axial direction, and wherein the first outer circumferential surface of the first rotator has a greater diameter than the second outer circumferential surface of the second rotator.

4. The torque limiter according to claim 1, wherein the entirety of the coil spring has a uniform inner diameter in an axial direction, and wherein the second outer circumferential surface of the second rotator has a greater diameter than the first outer circumferential surface of the first rotator.

\* \* \* \* \*